R. W. ENTREKIN.
SAW SETTING MACHINE.
APPLICATION FILED JAN. 29, 1910.
959,326.
Patented May 24, 1910.
2 SHEETS—SHEET 1.
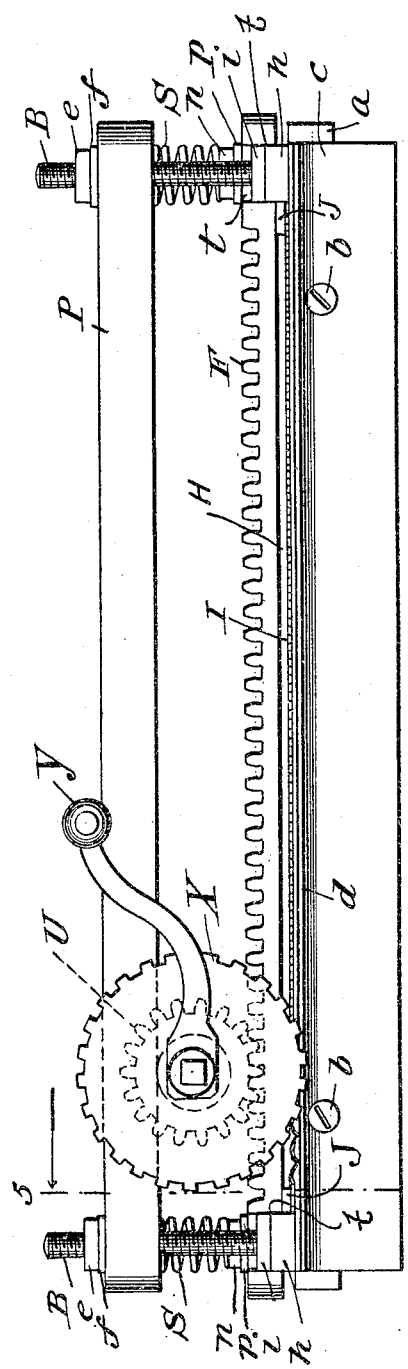
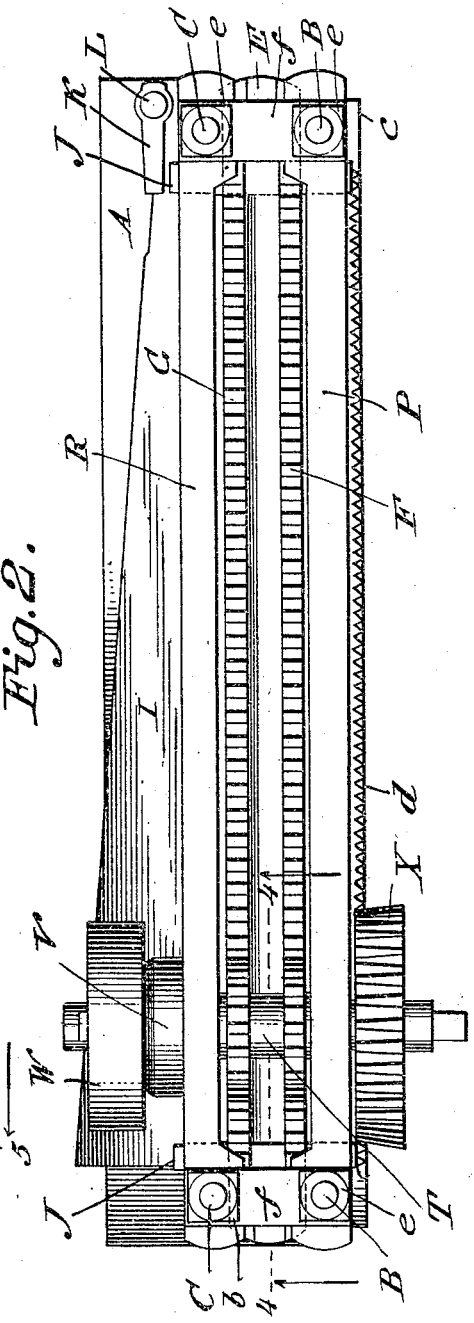

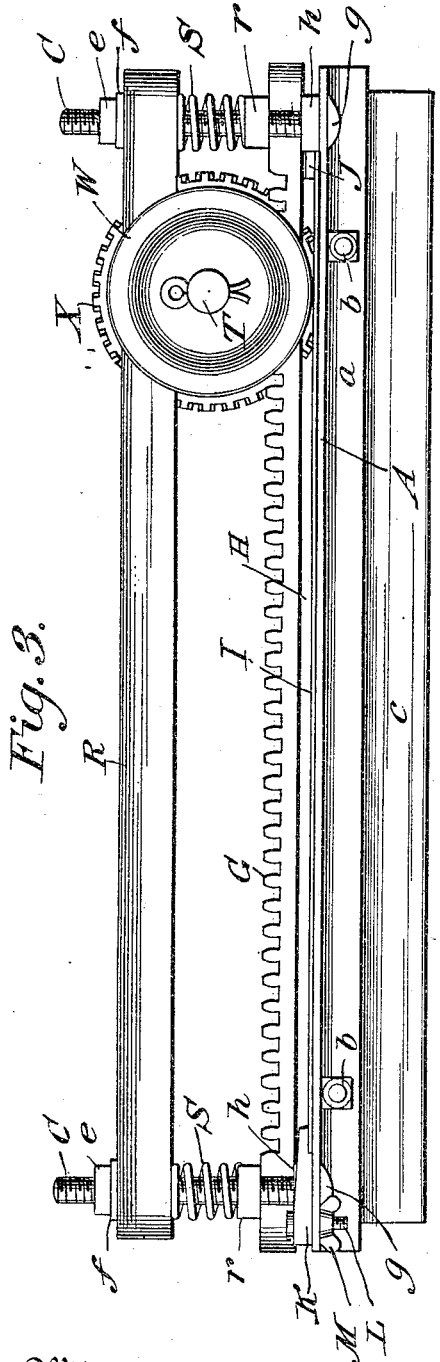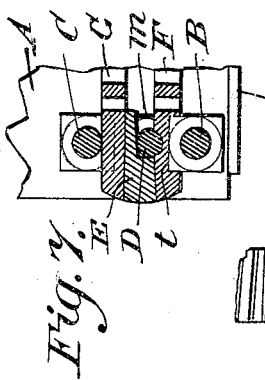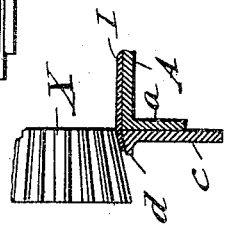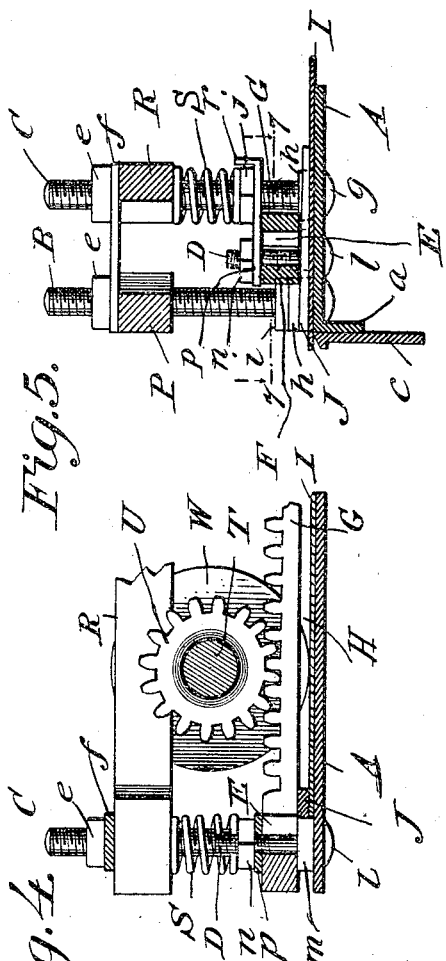

UNITED STATES PATENT OFFICE.

RAYMOND W. ENTREKIN, OF CRAIG, NEBRASKA.

SAW-SETTING MACHINE.

959,326.   Specification of Letters Patent.   Patented May 24, 1910.

Application filed January 29, 1910. Serial No. 540,871.

*To all whom it may concern:*

Be it known that I, RAYMOND W. ENTREKIN, a citizen of the United States, residing at Craig, in the county of Burt and State of Nebraska, have invented new and useful Improvements in Saw-Setting Machines, of which the following is a specification.

My invention relates to saw-setting machines; and it contemplates the provision of a simple, compact and durable machine through the medium of which an operator can expeditiously and properly set the teeth of a saw, with the expenditure of but little effort.

The invention will be best understood by reference to the following description when taken in connection with the accompanying illustration of one specific embodiment thereof, while its scope will be more particularly pointed out in the appended claims.

In the drawings which constitute part hereof: Figure 1 is a front elevation of my novel machine which is shown with a saw properly positioned therein. Fig. 2 is a plan view of the same. Fig. 3 is a rear elevation of the machine. Fig. 4 is a detail longitudinal section taken in the plane indicated by the line 4—4 of Fig. 2. Fig. 5 is a transverse section taken in the plane of the line 5—5 of Fig. 1. Fig. 6 is a fragmentary view illustrating the manner in which the traveling rotary set coöperates with an opposed beveled surface to deflect the saw teeth. Fig. 7 is a detail horizontal section taken in the plane indicated by the line 7—7 of Fig. 5.

Similar letters designate corresponding parts in all of the views of the drawings, referring to which—

A is the base of my novel machine, which, if desired, may form part of or be suitably fixed with respect to a table, bench or other suitable support. At its forward edge the said base is provided with a depending flange $a$, and to said flange $a$ is fixedly connected by bolts $b$ a longitudinal bar $c$ having a flange $d$ the upper surface of which is inclined downward from that of the base, Fig. 6, and is designed to be opposed to the rotary traveling set hereinafter described.

Suitably fixed to and rising from the base A adjacent the ends thereof, are threaded rods B and C, the rods B being disposed in front of the rods C, and all of the rods being equipped on their upper portions with nuts $e$. It will also be observed by comparison of Figs. 1, 2 and 5, that a plate $f$ is loosely arranged on the rods B and C adjacent one end of the machine, and a similar plate $f$ is arranged on the rods B and C adjacent the opposite end of the machine; the said plates being also arranged under the nuts $e$. I prefer to fixedly connect the uprights or rods B and C to the base A in the manner shown— that is to say, I provide each rod with a head $g$ disposed below the base A, and on each rod I arrange immediately above the base a nut $h$ so that the base is clamped between the head and the nut. I also arrange on each rod B and immediately above the nut $h$ thereof, a supplemental nut $i$, while upon each rod C and at about the distance shown above the nut $h$ thereof, I arrange a nut $j$, Fig. 5.

Adjacent each end of the machine I provide a bolt D which is arranged between the front and rear rods B and C and extends upward through the base A and is provided below said base with a head $l$ and immediately above the base with a nut $m$, all as best shown in Figs. 4 and 5. On each bolt D is a nut $n$, and mounted on each bolt D and the adjacent rod C and below the nuts $n$ and $j$ thereof, is a plate $p$ one end of which is turned up alongside the nut $j$, as indicated by $r$ in Figs. 3 and 5. Alongside each bolt D and below the plate $p$ thereon I provide a wedging block E, and at the opposite sides of the bolts D, with reference to the said wedging blocks, I arrange the end portions of one rack bar F which end portions bear on the nuts $m$ and have recesses $t$ in their outer sides which receive the adjacent nuts $h$ and $i$ and enable the said nuts to hold the rack bar F against longitudinal movement. It will also be here noted that the end portions of the rack bar F are disposed under the plates $p$, which serve to hold the rack bar against upward movement. At the opposite sides of the wedge blocks E, with reference to the bolts D, I provide a rack bar G which rests upon the nuts $h$ of the rods C and between said nuts $h$ and the plates $p$, and is clamped and held between the wedge blocks and the opposite portions of the rods C. By virtue of the construction described, it will be observed that when the wedge blocks E are removed subsequent to loosening of the nuts $n$ on the bolts D, the rack bars F and G may be readily removed. It will also be observed that by reason of the rack bars F and G resting on the nuts $m$ and $h$, respectively, a space H is afforded between the upper surface of the base A and the lower edges of the intermediate portions of the rack bars for the arrangement of a saw blade, indicated by I, between the base and rack bars.

For the purpose of retaining the saw blade in the position stated, I prefer to employ wedge strips J which are disposed transversely of the machine and rest upon the upper side of the saw blade I and between the same and the lower edges of the rack bars, as best shown in Figs. 1, 2, 4 and 5, and for the purpose of assisting the said wedge strips I prefer to employ the clamping plate K, Figs. 2 and 3, which plate is connected to the base A by the bolt L and the wing-nut M. It will be understood here that the wedge strips J and clamping plate K will securely hold the saw blade I in the position shown during the setting of alternate teeth of the blade, and then when said setting is completed, the wing-nut M may be loosened, and the wedge strips J may be knocked backward and loosened, whereupon the saw blade may be removed and reversed, and may then be replaced and secured between the rack bars and the base A for the reverse setting of its other teeth.

P is a longitudinal bar fixed on the front rods B and below the plate $f$ thereon, and R is a longitudinal bar loosely mounted on the rear rods C and below the plate $f$ thereon. The said bar R is supported by coiled springs S which surround the rods C and are interposed between the under side of the bar and the nuts $j$ on the rods C, as best shown in Figs. 3 and 5, for a purpose hereinafter set forth.

T is a transverse shaft which extends through the space between the rack bars F G and the longitudinal bars P R. The said shaft carries spur gears U which mesh with the rack bars, and it is also provided with a collar V, a traveling wheel W, a rotary traveling set X and a crank Y. The collar V and the set serve by moving against the outer sides of the bars R and P, respectively, to hold the shaft T against play in the direction of its length while the wheel W travels on the saw blade I and assists in holding the same against casual movement during the setting operation. In this connection it will be noticed that the nuts $e$ crowd the bar R down against the shaft T, and in that way hold the wheel W under pressure; and it will also be noticed that when the nuts $e$ are turned upward on the rods C, the springs S will raise the bar R and relieve the pressure of the same on the said shaft T. The rotary traveling set X has its periphery beveled and toothed, and the teeth are arranged such a distance apart as to operate against every other tooth of the saw blade. From this it follows that when the saw blade is secured in the manner described in the machine, and the crank Y is turned, the wheel X will set every other tooth of the saw during the traverse of the wheel from one end of the machine to the other. Then when the saw is removed and reversed and again properly positioned in the machine, the wheel or rotary set X will in its movement back to the position shown in Fig. 2, properly set the other teeth of the saw.

It will be gathered from the foregoing that my novel machine is simple and inexpensive in construction and is adapted to be operated with the expenditure of but little effort; also, that through the medium of the machine the teeth of a saw may be expeditiously set in a proper manner.

While I have shown and described one form of my invention, it is to be understood that I am not limited to the details or the form or relative arrangement of parts disclosed, but that modifications may be made therein without departing from the scope thereof.

Having described my invention, what I claim and desire to secure by Letters-Patent, is:

1. In a saw setting machine, the combination of a base having a downwardly inclined surface at its forward edge, front and rear threaded rods fixed to and rising from said base adjacent the ends thereof, threaded bolts fixed to and rising from the base at points between the front and rear rods, nuts mounted on the rear rods and arranged immediately above the base, nuts mounted on the front rods and arranged immediately above the base, nuts mounted on the bolts and arranged immediately above the base, nuts mounted on the threaded rods at the rear and at intermediate points in the height of said rods, upper nuts mounted on the bolts, plates arranged below said nuts on the rear rods and the bolts, rack bars supported on the lower nuts of the rear rods and bolts and interposed between said nuts and the plates; one of said rack bars having recesses in its outer side receiving the adjacent nuts, wedge blocks interposed between the other rack bar and the bolts, coiled springs mounted on the rear rods, above the intermediate nuts thereof, a longitudinal bar loosely mounted on said rods and supported by the springs, nuts mounted on the rear rods above said bar, a longitudinal bar secured on the front rods, means for holding a saw blade in the space between the base and the rack bars, a transverse shaft interposed between the rack bars and the longitudinal bars and having spur gears intermeshed with the rack bars and also having a collar movable at the outer side of the rear longitudinal bar and further having a wheel adapted to travel over and exert pressure against a saw blade, a rotary traveling set fixed on the shaft and having a beveled periphery opposed to the said inclined surface of the base and also having setting teeth on said periphery, and means on the shaft for turning the same.

2. In a saw setting machine, the combination of a base having a downwardly inclined surface at its forward edge, rack bars supported above the base to afford a saw-receiving space between them and the base, longitudinal bars supported above the rack bars, and a transverse shaft movable between the rack bars and the longitudinal bars and equipped with spur gears and with a rotary traveling set having a beveled and toothed periphery opposed to the said downwardly inclined surface of the base.

3. In a saw setting machine, the combination of a base having a downwardly inclined surface at its forward edge, a rack supported above the base to afford a saw-receiving space between it and the base, a transverse shaft having a spur gear intermeshed with the rack and also having a rotary traveling set the periphery of which is beveled and toothed and opposed to the said downwardly inclined surface of the base, and means disposed above the shaft and connected with the base for retaining the spur gear in engagement with the rack during the traverse of the set.

4. In a saw setting machine, the combination of a base having a downwardly inclined surface at its forward edge, rack bars supported above the base to afford a saw-receiving space between them and the base, front and rear longitudinal bars arranged above the rack bars and connected with the base, coiled springs disposed below and yieldingly supporting the rear longitudinal bar, means for crowding said bar downward against the action of the springs, and a transverse shaft movable between the rack bars and the longitudinal bars and having spur gears and a wheel at its rear end adapted to travel over a saw blade and also having on its forward portion a rotary traveling set the periphery of which is beveled and toothed and opposed to the said inclined surface of the base.

In testimony whereof I have hereunto set my hand in presence of two subscribing witnesses.

RAYMOND W. ENTREKIN.

Witnesses:
J. C. MARTIN,
A. A. DANIELSON.